United States Patent [19]

Scholes

[11] 4,371,387
[45] Feb. 1, 1983

[54] METHOD AND APPARATUS FOR HANDLING GLASSWARE

[75] Inventor: Addison B. Scholes, Muncie, Ind.
[73] Assignee: Ball Corporation, Muncie, Ind.
[21] Appl. No.: 289,356
[22] Filed: Aug. 3, 1981
[51] Int. Cl.³ .............................................. C03B 35/12
[52] U.S. Cl. ...................................... 65/118; 65/60.1; 65/119; 65/227; 65/260
[58] Field of Search ................... 65/118, 119, 227, 260

[56] References Cited

U.S. PATENT DOCUMENTS

| | | | |
|---|---|---|---|
| 3,498,819 | 3/1970 | Lyle et al. | 65/120 X |
| 3,764,284 | 10/1973 | Rowe | 65/260 X |
| 3,787,197 | 1/1974 | Snyder et al. | 65/260 |
| 4,325,725 | 4/1982 | Fujimoto | 65/260 X |

Primary Examiner—Arthur D. Kellogg
Attorney, Agent, or Firm—Gilbert E. Alberding

[57] ABSTRACT

The present invention was developed to provide an improved process for retaining the substantially pristine state of glass articles, particularly thin-walled, lightweight glass containers. In particular, this invention relates to a process of maintaining the strength of glass containers formed from molten glass gobs as encountered especially in conventional press-and-blow or blow-and-blow equipment of individual section glass machines, the process comprising initially forming a formed portion from each of said gobs, fully forming the remaining portions of the containers from said gobs, grasping the thus-formed containers only at the initially formed portion and transferring them to a cradle device whereby said containers are held in spaced relationship to each other and held free of contacting any solid or unsmooth surface including stoplates, bearing surfaces, conveying belts and the like, partially cooling immediately following the formation of said containers, moving said cradle device with the accompanying containers to an annealing zone whereby the containers including the bottom walls thereof are subjected to a controlled rate of cooling therein, and finally rapidly cooling said containers to ambient temperature while still being gripped only at the initially formed portions thereof.

13 Claims, 6 Drawing Figures

METHOD AND APPARATUS FOR HANDLING GLASSWARE

BACKGROUND OF THE INVENTION

This invention relates to a method and apparatus for handling newly formed glass articles, and, more particularly, the subject invention concerns a novel manipulative process and apparatus for carrying or conveying lightweight containers immediately following their formation so that their pristine characteristics are preserved yet still allowing for further embodiment, including annealing.

There have been substantial efforts of late in the glass industry to make glass containers with thinner sidewalls in order to render them lighter in weight and, therefore, more economical in their production. Because the walls are thinner, such lightweight glass containers are more prone to breakage or fracture. Thus, there have been investigations to find suitable means to strengthen these containers while allowing cost savings through the use of thinner walls. Although such lightweight glass containers may be readily produced by the conventional processes by carefully controlling the molten glass gob introduction, the molding technique and the like, such glass containers cannot be commercially used employing the state of the art equipment and processes since the containers so processed suffer easy breakage or fracture.

As is known, the tensile strength of perfect glass is exceedingly high, if the surface of the glass is completely unabraded. That is, the intrinsic strength of glass may be, for example, more than 7,000 Kg/cm$^2$ in a nonscratched or unabraded state, the so-called original or pristine glass state, but, when the surface is checked or bruised, its strength is substantially lowered, for example, to about 200 Kg/cm$^2$. When glass articles are conveyed by conventional equipment such as when newly formed glassware articles are transported en masse on a conveyor belt through an annealing lehr, the glassware articles are not only being abraded by such a conveyor means on the contacting points or surfaces thereof, but the glassware articles themselves are abraded in making contact with each other and thus are checked or bruised whereby their strength is lowered to a marked degree.

In the manufacture of glass articles such as containers by conventional practices, molten glass issuing from a furnace is formed by either press-and-blow or blow-and-blow processes and is then transferred while still hot to a conveyor whence the containers are subsequently transferred into an annealing lehr. While the containers are at an elevated temperature and being handled on conveyors and transfer equipment including pusher-bars and the like, the glass surfaces remain extremely susceptible to damage by merely contacting any hard or abrasive surface. A major reason for this is that the glass articles in cooling do so faster at the exterior surface than at the interior and therefore the exterior surface or skin of said articles is in a state of tension like a stretched rubber band and is highly susceptible to damage while in that condition. Thus, in making contact with any hard surface the skin may be readily ruptured.

In transferring glass containers various conveying devices are conventionally used. In this regard it is exceedingly difficult, if not impossible, to deliver newly formed glassware articles while still very hot without exposing them to some degree of deformation, abrasion or fracture during the transferring operation. Likewise, each point of contact could cause loss or damage due to hot glass surfaces contacting one another and sticking together. Moreover, to those familiar with the manufacture of glass containers, it will be appreciated that the normal methods employed to transfer containers not only subject the glass surfaces to severe contact damage as described but also cause loss thereof due to upsets where scores of containers fall and break during their travel in conventional processing and handling.

Various proposals have hitherto been made in order to protect glass articles from scratching or bruising and to improve the strength thereof. The present invention is intended to maintain the pristine state of glass by providing means to avoid the formation of substantial defects including flaws, checks or microcracks on the surfaces of glass articles, such defects being responsible for the failure of glass articles under load. In effect, the subject invention relates to a method of avoiding or substantially reducing the formation of the aforementioned defects by using a novel manipulative process for handling newly formed glass articles, especially lightweight glass containers.

U.S. Pat. No. 3,392,006 to Seymour describes a glass gripping tong device whereby glass articles are suspended such as glass sheet during thermal treatment, tempering, coating and press bending. U.S. Pat. No. 3,559,425 to Irwin, et al., teaches a glassware takeout device which grasps the neck portion of a container and moves it without touching its bottom to a moving conveyor. U.S. Pat. No. 3,615,327 to McLary discloses a method of coating glass containers while being suspended and conveyed along a given path of movement. Further U.S. Pat. No. 3,765,856 to Bowman discloses a method of engaging bottles at their finish or neck and lifting them from one movable support to another out of contact with each other. Further, U.S. Pat. No. 3,764,284 to Rowe discloses a method of treating newly formed glassware while being suspended so as to expose the base portion to cooling fluids or a metallic chloride spray. Again, U.S. Pat. No. 3,846,101 to Gaskell, et al., discloses thermally crystallizing a ceramic article while being supported in a vertical attitude. The article is suspendingly supported with its major axis or plane of symmetry extending downwardly during the heating step to obtain crystallization. Lastly, U.S. Pat. No. 3,934,993 to Bowman, et al., discloses a glassware handling and treating device for bottles by gripping and suspending them from a conveyor means and passing them over a heating zone, a cooling zone and drying zone for removing surface irregularities.

SUMMARY OF THE INVENTION

This invention relates to a method of decreasing the breakage under load or impart of a newly formed glass container, the method comprising forming a glass container including the finish thereof in a glass forming mold, removing said glass container from the mold by engaging only the finish of said container, allowing the glass container, except for the engagement at the finish, to remain free of contacting any solid surface, and maintaining said container in engagement at the finish until the glass container is substantially cooled to ambient temperature.

The present invention was developed to provide an improved process for retaining the substantially pristine state of glass articles, particularly thin-walled, lightweight glass containers. In particular, this invention relates to a process of maintaining the strength of glass containers formed from molten glass gobs as encountered especially in conventional press-and-blow or blow-and-blow equipment of an individual section glass machine, the process comprising initially forming a formed portion from each of said gobs, fully forming the remaining portions of the containers from said gobs, grasping the thus-formed containers only at the initially formed portions and transferring them to a cradle device whereby said containers are held in spaced relationship to each other and held free of contacting any solid or unsmooth surface including stoplates, bearing surfaces, conveying belts and the like, partially cooling said containers immediately following the formation of said containers, moving said cradle device with the accompanying containers to an annealing zone whereby said containers including the bottom walls thereof are subjected to a controlled rate of cooling therein, and finally rapidly cooling said containers to ambient temperature while still being gripped only at the initially formed portions thereof.

It is a main object of the present invention to provide a process for treating thin-walled, lightweight glass containers formed by the press-and-blow or the blow-and-blow process to maintain or improve the strength of said containers at least to a commercially acceptable level.

It is another object of the subject invention to retain the strength of glass containers by a method that allows the cross-sectional thickness of glass walls thereof to be substantially reduced while retaining strength-to-load characteristics.

It is another object of this invention to provide a handling technique for newly formed glass containers to substantially reduce the formation of microcracks and the potential propagation thereof under load, impact or internal pressures.

It is another object of the subject invention to provide a process of advantageously manipulating hot, newly formed glassware after its formation and through the annealing process with attendant treating steps, as required, including hot and cold end treatments as well as internal treatments.

It is yet a further object of this invention to provide a process whereby glass containers can be directly and quickly conveyed from their glass-forming cavity while retaining sufficient heat whereby little or no further heating is required in a subsequent annealing process.

Numerous other objects and advantages of the invention will be apparent as it is better understood from the following description, which, when taken in connection with the accompanying drawings, discloses the preferred embodiment thereof.

DESCRIPTION OF THE PREFERRED EMBODIMENTS

Figure 1:
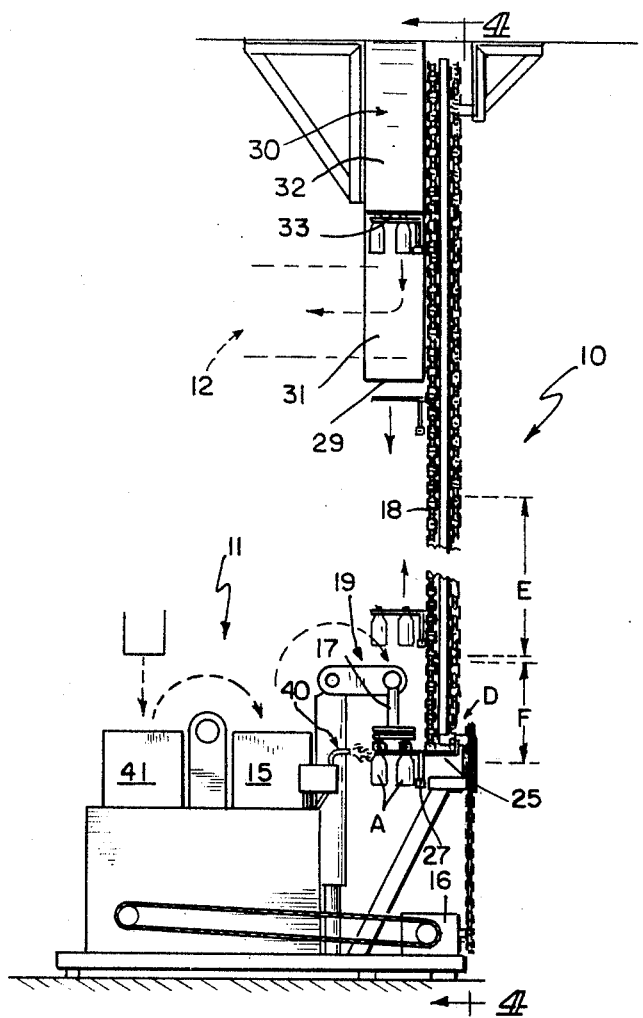
FIG. 1 is a simplified perspective view showing a glassware forming machine, annealing lehr and other equipment in one form of installation embodying the present invention.
Figure 4:
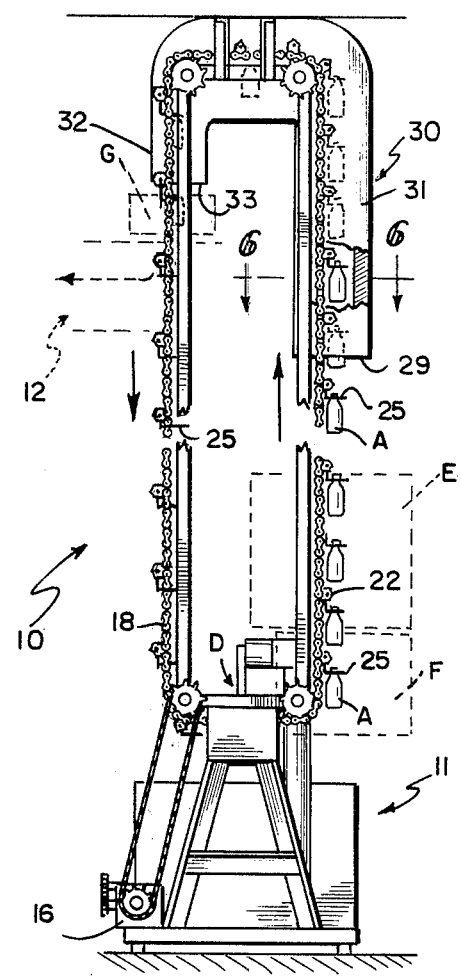
FIG. 4 is a perspective view, partially shcematic, of the transfer or manipulative system for containers in accordance with this invention.
Figure 2:
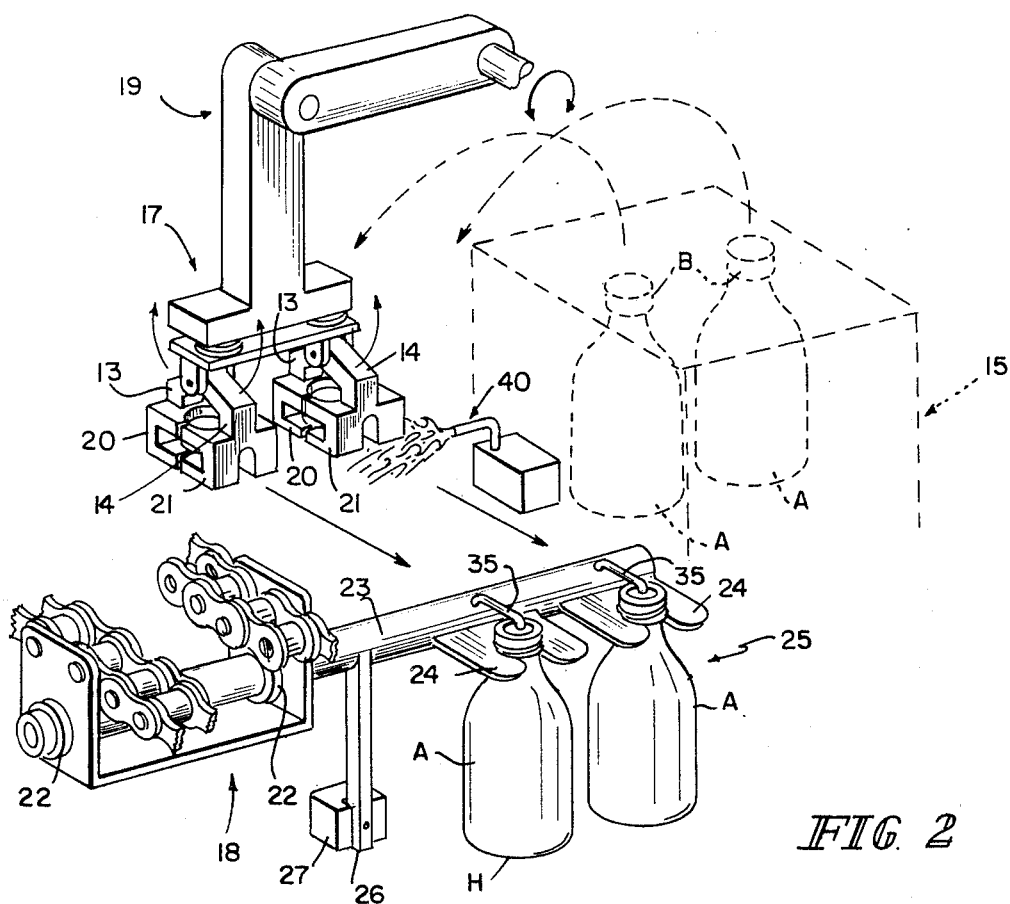
FIG. 2 is a detailed side elevational view showing freshly formed glass containers being taken from a forming machine by a gripping device.
Figure 5:
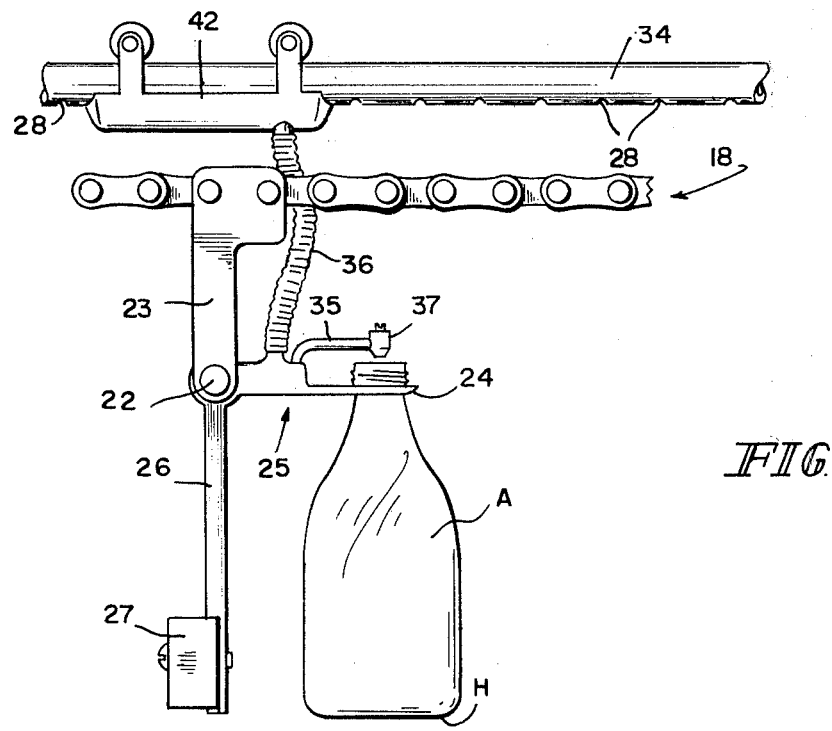
FIG. 5 is a side view of a cooling device for directing fluid into the interior of a container being transported in accordance with one aspect of the invention.

FIG. 1 and FIG. 4 are views of the manipulative equipment and treating means of the subject invention shown diagrammatically in one embodiment. The manipulative equipment, generally designated 10, is disposed between a glassware forming machine 11 and a takeoff and inspection station or area 12. The glassware forming machine 11 is of a type known as a double gob, individual section machine in which each machine section produces a pair of glass articles, specifically, a pair of glass containers A, during each cycle of operation. As best seen in FIGS. 1 and 2 each section of the double gob machine has a takeout apparatus 19 associated therewith, said apparatus 19 having two pairs of receiving arms 13 and 14 and engaging members connected thereto designated 20 and 21 which remove the glass containers A from a blow mold 15 after the containers have been blown and expanded to the final configuration.

In forming glass containers, especially lightweight containers, and, in particular, for those containers having a glass weight less than the three-fourths power of the capacity of the container, it is to be realized that careful controls are to be maintained as to the manner of feeding the molten glass gobs via chute into the molds as well as the shaping conditions. In particular, the wall thickness of the glass containers require control of the molten glass gob introduction and the molding techniques, including the particular configuration of the glass parison, the wall thickness of the parison, forming mold and the time interval of contact as between the glass and the mold, and/or the amount of the cooling applied to the walls of the parison shaping mold and the like.

Upon feeding a molten gob to the glassware forming machine 11 it is received in a blank mold 41 and worked to form a parison and finish or neck portion B that is transferred into a blow mold 15 and expanded immediately into the final container. As the finish or neck portion B is the initial part formed and cooled it is the first to become essentially rigid so as to be engageable by the takeout apparatus 19. It will be seen that the newly formed container is held and transferred by the engaging members 20 and 21 thereof, the container being held substantially free in a vertical attitude, not being allowed to come in contact with any solid surface such as a dead plate or other metal or glass surface.

Figure 3:
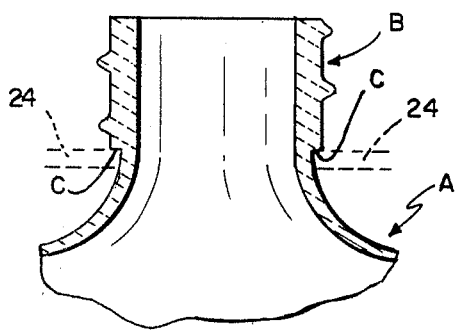
FIG. 3 is an end elevation, partially in section, of the finish or neck portion of a container.

As seen best in FIG. 2, a pair of newly formed glass containers A are gripped by their finish B and moved through an arc by the takeout apparatus 19 so that the containers are positioned adjacent a chain conveyor 18. In the embodiment herein shown the takeout apparatus 19 is coordinated with the glassware forming machine 11 and swings the containers away from the open blow molds 15 as the containers are fully formed. The takeout apparatus 19 is provided with a gripping device 17 which has two pairs of engaging members 20 and 21 that are matched jaws provided with slots that directly engaged and shoulder or curvilinear portion C of the finish B as shown in FIG. 3. It has been found that such a jaw configuration firmly anchors the newly formed glass containers so that they remain in a vertical attitude and are not susceptible to lateral or pendular movement. The chain conveyor 18 is positioned at right angle to the takeout apparatus 19 and the conveyor's travel synchronized by drive motor 16 so that the engaging members 20 and 21 come directly into alignment with a section designated D of the chain conveyor 18 that carries therewith a plurality of spaced apart holders 25 thereon. The holders 25 are pivotally mounted at 22 and comprise an extender 23 connected to the chain conveyor 18, an U-shaped cradle 24 having connected thereto a bar 26, and a counterweight 27 attached thereto. As the containers A and removed from the mold 15 they are brought into register with spaced apart holders 25 of the chain conveyor 18. The movement of the gripping device 17 is such that it momentarily pauses in operation at which time the holders 25 traveling on the conveyor come in alignment with the finish B of containers. At that brief instant the arms 13 and 14 release the containers A into the holders 25 which advance the containers in the direction of travel as indicated by the arrows.

The gripping device 17 as well as the holders 25 are maintained at an elevated temperature and are preferably lubricated, the heating and lubrication being found advantageous to avoid chill cracking or otherwise forming an incipient break or check in the finish. In a preferred embodiment the gripping device is heated by a directed gas flame 40 for a few seconds upon the release of the containers.

It is to be noted that when the containers are placed adjacent to the chain conveyor they are moved into the holders 25 so that the holders reengage only the portion of the finish that was previously engaged. The portion of reengagement is the straight wall or curvilinear portion C of the finish B as shown in FIG. 3.

Newly formed glassware that comes from the machine 11 is partially cooled. For example, conventional soda-lime glass as formed from the mold usually has a temperature within the range of about 1100° F., to above 1200° F., and after removal the glassware cools slightly several hundred degrees. This partial cooling allows the ware to be self-supporting and makes it possible to set the ware on its base or bottom wall H as has been the practice heretofore. However, as already mentioned, it is this bottom wall as well as other portions which contact solid surfaces that create a high degree of defects and in accordance with this invention the likelihood of such defects are substantially reduced or completely removed.

In one preferred embodiment the glass containers A are conveyed to a partial cooling area F where the containers may be cooled to a temperature corresponding substantially to the annealing point of the glass and thereafter the glass can be, if desired, further cooled or chilled to a temperature below its strain point. In general, the glass may be rapidly cooled or tempered to cause the formation of a surface layer stressed in compression which strengthens the glass. This substantial cooling herein contemplated may be done with a fluid such as air or some other medium, such as a fluidized bed, the fluid being capable of providing a maximized rate of heat transfer as well as uniform cooling of the containers to avoid the creation of unbalanced stresses in the containers which may weaken or break them.

From FIG. 1 it is shown that the containers A are fully suspended in a vertical attitude and are brought upwardly into a vertical or upright lehr 30. The lehr 30 prividues a hot enclosure for the containers traveling therethrough and includes an annealing section 31 on the upward side of the lehr and a cooling section 32 on the downward side. Glass containers are received at the entrance 29 of the lehr 30 at or above the annealing temperature. As the containers A in spaced apart relationship pass through the annealing section, the temperature of the lehr is equilized by radiation, convection and conduction to a predetermined temperature range, that is generally between the annealing point and the strain point temperature of the glass. For soda-lime glass this temperature is in the range of about 955° F., to about 1025° F. In general, the annealing point of glass is usually defined as the temperature at which glass has a viscosity of $2.5 \times 10^{13}$ poise and has enough internal mobility to relieve itself of strains. The strain point temperature is the lower of the two. At the strain point temperature, the viscosity of glass is higher and the glass will only relieve itself of internal strains after a period of time. At the exit end 33 of the lehr 30 the containers are at a predetermined temperature. For example, for soda-lime glass this temperature should be about 950° F., ±25° F.

Figure 6:
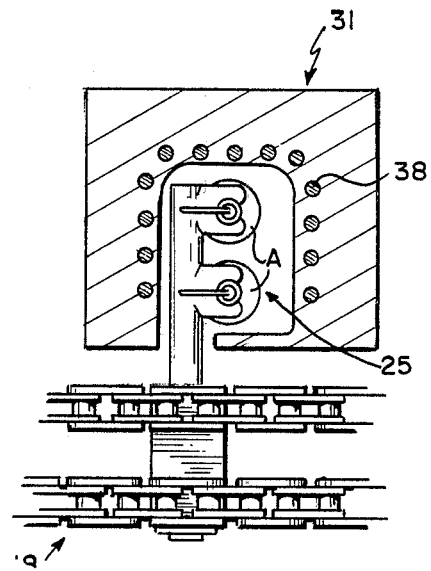
FIG. 6 is a sectional view showing the containers passing through the annealing lehr, the view being one taken along line 6-6 of FIG. 4.

The lehr provides a vertical enclosure for the glass containers while being suspended by their necks to travel during the annealing process. As seen best in FIG. 6 the heat in the lehr is provided by electric heating element 38. The amount of heat is controlled to reach an equilibrium temperature with the containers. The heat mass, speed and temperature of the conveyed containers are factors controlling the degree of heating required. It will be appreciated that as the containers are conveyed in the lehr, the glassware in effect is cooled in a controlled manner by losing heat. The desired result as the containers travel through the lehr is that the containers are brought to or below their strain point temperature. After the strain point is reached, the containers may be rapidly cooled. This rapid cooling is readily done in the cooling section 32 of the lehr by air blown downwardly, after the containers complete the annealing process.

An advantage of the vertical or upright lehr configuration as manifested herein is that there is a more even and uniform treatment accomplished on the containers. This is particularly impartant along the greater surface areas of the containers, especially the longitudinal areas of such containers. Under conventional processes where a multiplicity of containers are passed through a lehr there is no uniform and even treatment because of the proximity or adjacency of other containers which block or interfere. This is especially significant with treatments which propagate radially from a point or propagate from a plane or front as for example, in the annealing section of the lehr where radiation plays a major role in thermal treatment. When the containers are held in a vertical attitude and consecutively moved upwardly through and surrounded by the radiating walls of the lehr, the treatment has its full effect on the greater longitudinal surface areas of the containers.

It should be mentioned that glass containers made by conventional processes have a heavier bottom cross-section than wall cross-section. As is known, the rate at which glass can be properly annealed is a direct function of its cross-sectional thickness. Therefore, the speed with which a glass container can be annealed is limited by the speed with which the bottoms of the container can be annealed. Since glass containers are annealed in the conventional process with their bottom section resting on a metal belt, and since heat is generally transferred by conduction from the glass to the belt as well as from the belt to the glass, the temperature of the belt and the bottoms of glass containers in contact with the belt are essentially the same. It follows that the containers cannot be cooled through their annealing temperature range at any speed greater than the speed with which the belt can be cooled. In the same manner, the glass containers cannot be cooled to an exit temperature, generally between about 200 and 300° F., at any speed greater than the speed with which the lehr belt can be cooled to this same temperature range. The consequences of these interacting functions is that a typical container glass annealing lehr must indeed be long in design, viz., about 60 to 90 feet, and the conveyor belt generally moves at a rate of about 1 to 2.5 feet per minute to anneal something like 150 containers per minute.

In the present practice of annealing glass containers, the containers are generally conveyed a considerable distance from their mold removal point to the annealing lehr. Those containers exiting from the more distant sections of the glass machine arrive at the annealing lehr transfer point at a temperature lower than those containers exiting from the nearer glass machine sections. Therefore, a major portion of the lehr length and energy must be used for reheating containers that have cooled during conveyor travel. It is one aspect of this invention to eliminate these differences in lehr entrance glass temperatures in that it is no longer necessary to reheat containers entering the annealing lehr, that is to a temperature slightly above the glass annealing point, such as about 1100° F. In contrast to such energy and time wasteful practices, the subject invention removes glass containers directly from their molds by their finish and conveys them directly and quickly into an annealing zone where they arrive at a predetermined temperature. Thus, each glass container retains sufficient heat from the molding operation such that only controlled cooling is required to obtain correct annealing. It follows that each container enters the annealing zone at the same temperature, and is subjected to the same thermal treatment with no reheating being required. Since the containers are completely free of bottom contact, the necessary controlled cooling for correct annealing can be achieved in a substantially shorter time. Thus, depending on container size and bottom thickness, the subject invention allows annealing and cooling to be completed within about 5 to 10 minutes as compared to about 40 to 75 minutes that would be required for a conventional glass annealing lehr. Moreover, conventional conveyor belts for lehrs are subject to thermal treatment variations from one belt geometry to another and this results in variations in the degree of annealing due to the position of various containers thereon. Since all containers receive identical thermal treatment in accordance with this invention, the annealing of all glass containers is the same.

In another embodiment of the subject invention the internal portions of the containers may be subjected to cooling by a fluid as the containers are held in their vertical attitude. This is readily accomplished by providing a pipe 34 situated proximate the chain conveyor 18, the pipe 34 having a number of spaced apart holes 28 facing the containers and a collector 42 slidably mounted thereon that is connected to the holder 25 by a conduit 36. The holder 25 has attached thereto a blowpipe 35 that communicates with conduit 36, said blowpipe 35 having a nozzle 37 for directing fluid such as air or other gaseous substance into the internal portions of the containers. In this regard the interior may be cooled at a rate substantially equal to that of the exterior of the container along any given zone or zones of the subject process. If desired, the containers may be heated externally while the internal portions are cooled. Thus, the subject invention leads itself to concurrent heating and cooling of containers to enhance the properties thereof.

As the containers are being transported, they may be readily treated by hot and/or cold end treatments. For example, when suspended by their finish the containers may be treated with various compositions including metal halides, metal oxides, metallo-organic compounds and the like. In such applications the temperature of treatment is generally in excess of about 600° F., depending upon the specific composition, and in most cases the process is practiced at temperatures in the order of about 900° F., and above. Application of such coatings can conveniently be made either while the containers are still residually heated from the forming process as indicated by zone E or in conjunction with annealing as indicated by zone F in FIG. 4. On the other hand, compositions for cold end coatings such as oleic acid and various organic esters may be readily applied to the container as they exit the cooling section 32 of the annealing lehr 30 viz., zone G.

The subject invention is an improvement over the prior art in that the glass containers are removed from the container-forming molds and moved without touching, aside from selected areas of the neck portion itself, any portion of the container to cause glass-to-glass or glass-to-metal contact during the entire treatment of the container, viz., from mold to inspection. By following the teachings of this invention the as-molded integrity of the glassware is maintained and when this invention is utilized with a lightweight glass-forming process, there is achieved an improvement in the strength characteristics over that of glassware manufactured by conventional glassware-forming processes.

The following example illustrates one embodiment of the invention. Using a double gob individual section of a glass container forming machine, a pair of newly formed 12-ounce, narrow-neck glass containers made from soda-lime glass are transferred by means of a pair of jaws of a takeoff mechanism which grip only their finish from the blow molds to a position adjacent to a chain conveyor in accordance with this invention. The chain conveyor is provided with a series of extended holders spaced at equal intervals approximately 12 inches apart, each holder being arranged so that it rides at right angles to the conveyor chain and extends outwardly therefrom at one side thereof. Attached to each holder is a pair of horizontal U-shaped cradles that are positioned and spaced to agree exactly with the on-center spacing of the takeout jaws. Each cradle is provided with a counter balancing device consisting of a weight whose position is adjustable both relative to the rotation angle and to the distance from the center of rotation of the holder. The conveyor chain is caused to be in continuous motion at a constant velocity such that it is synchronized to present one horizontally positioned moving holder with its cradles to an exact location relative to the aforementioned takeout jaws. The forward moving pair of cradles align themselves with the finish of the glass containers and at the instant the finish of the containers is fully entered into by the U-shaped cradles the takeout jaws opened and retract upwardly and away from the cradle arms. This series of events causes a transfer to take place whereby two newly formed glass containers are taken up in the cradles. This action is repeated every five seconds, the chain conveyor moving at a constant velocity of about 12 inches every 5 seconds.

The suspended glass containers are caused to move horizontally a short distance away from the transfer point, and thence move upward, still suspended vertically, as the chain passes over a turning sprocket. The containers maintain a vertical attitude by the action of the pivots to which the two cradles are affixed and a pendant counterweight that balances the two containers.

Immediately after the containers begin to move upward, they enter into an annealing zone where controlled cooling takes place. This annealing zone extends upwardly about 20 feet. Due to the constant velocity of the conveyor chain, glass containers remain in the annealing zone for about 100 seconds. By air cooling the thick bottom areas, while retarding the cooling of the thin sidewall areas by means of radiant panels placed in the lehr, the newly formed containers are brought from an average annealing zone entering temperature of about 1100° F., to an average annealing zone exiting temperature of about 930° F., and thereafter begin to move vertically downward. Beginning at the time the containers exit from the annealing zone they are subjected to intense air cooling to bring them to essentially ambient temperature. The entire length of travel of the containers, including their initial horizontal movement from the transfer point, their vertical movement through the 20-foot annealing zone, a horizontal return movement, and the downward movement to the removal point, is about 35 feet. Since the chain conveyor is moving at a constant velocity of about one foot each five seconds, the total dwell time of the glass containers on their traveling cradles is about 175 seconds. The conveyor chain itself continues to move downward and thence horizontally to complete a loop of a total length of 45 feet.

The containers are removed from their holding cradles by a timed movement of a set of combined steady arms and bottom plates. This removal action is aided by the downward movement of the cradles as the cradles attached to the chain conveyor move downward with the conveyor. At the correct time, the pair of steady arms and bottom plates are caused to move into position such that the cooled container bottoms contact the plates. As the cradles continue downward, the containers, restrained by the plates, arrest their downward movement and release from their contact, in the finish area, with the cradles. At that instant, the steady arms and bottom plate assemblies move out of the path of the conveyor chain carrying the cradles and transfer the containers, now at about ambient temperature, onto a moving smooth plate conveyor and there into an inspection area. The 12-ounce containers formed have increase strength characteristics, e.g., an average internal bursting strength of about 480 p.s.i., over that produced by conventional means, e.g., an average bursting strength of about 250 p.s.i.

In view of the above, it will be seen that several objects of the instant invention are achieved and other advantageous results attained. While the present invention has been disclosed in several preferred embodiments, it should be understood that various modifications and substitutions can be had without departing from the spirit of the invention. For example, the particular lehr and arrangement thereof may be placed on a lower level beneath the glass forming machine. Various gripping devices and means may be used to carry the freshly formed containers from the takeoff machine. Further, although the process has been disclosed in terms of a double gob, individual section machine, single gob or triple gob configurations are also contemplated. Accordingly, the present invention has been described in several preferred embodiments by way of illustration rather than limitation.

What is claimed is:

1. A method of maintaining the strength of glass containers formed from a glass container forming machine comprising the steps of providing molten glass gobs to said machine, initially forming from said gobs finish portions for said containers, immediately forming from said gobs the remaining portions of said containers, transferring the fully formed containers in spaced relationship from each other while being held only at their initially formed portions to a moving cradle means proximate to said machine, said cradle means engaging only said previously held portions of the containers, allowing the newly formed containers to partially cool immediately following their formation, annealing said containers while so held including their bottoms whereby said containers are subjected to a controlled rate of cooling, and finally rapidly cooling the annealed containers to about ambient temperature while held by the initially formed portions.

2. A method of claim 1 including the step of rapidly heating the containers after the partially cooling immediately after their formation, said rapid heating including directing flames onto the glass container whereby the surface of the container is slightly softened.

3. A method of claim 1, wherein the glass gobs are soda-lime glass.

4. A method of retaining the pristine characteristics of newly formed glass containers formed from an individual section machine comprising providing molten glass gobs to the machine, initially forming the neck portions from said gobs, immediately forming the remaining portions of said containers, gripping only the neck portions thereof, advancing said containers while so gripped to a treating zone, applying coating material to the surfaces of said containers in said zone, allowing the residual heat of said containers to unite the material with the surface, passing the treated containers while held by their neck portions into an annealing zone whereby the containers are subjected to a controlled rate of cooling, and substantially cooling said annealed containers to about ambient temperature.

5. A method of claim 4 wherein the glass gobs are soda-lime glass.

6. A method of retaining the pristine characteristics of newly formed glass containers formed from an individual section machine comprising providing molten glass gobs to the machine, initially forming neck portions from said gobs, immediately forming the remaining portions of said containers, gripping only the neck portions thereof, passing the newly formed containers while still held by their neck portions into an annealing zone whereby the containers are subjected to a controlled rate of cooling, advancing said containers while so gripped to a treating zone to apply a coating material to the surface of said containers in said zone, and substantially cooling said containers to about ambient temperature.

7. A method of claim 6 wherein the coating material is a cold end treating compound.

8. A method of retaining the pristine state of newly formed glass containers formed from an individual section machine comprising providing molten glass gobs to the machine, initially forming neck portions from said gobs, immediately forming the remaining portions of said containers, gripping only the neck portions of said containers and removing said containers from the machine, advancing said containers consecutively in a vertical direction through at least one treating zone to direct a coating material onto said containers while being gripped only by the neck portion, advancing consecutively in a second vertical direction said containers through an annealing zone while so gripped whereby said containers are subjected to a controlled rate of cooling, further cooling said containers to about ambient temperature, and thereafter releasing said containers in succession into an inspection area.

9. A method of claim 8 wherein the coating material is a metal halide, metal oxide or a metallo-organic compound.

10. A method of claim 8 wherein the at least one treatment zone directs a treatment medium along a path substantially normal to the longitudinal axis of the containers.

11. A method of claim 8 wherein during their advance air is propogated internally of said containers.

12. A method of claim 8 wherein the glass gobs are soda-lime glass.

13. An apparatus for manipulating glass containers newly formed from an individual section machine to maintain the inherent strength characteristics of said containers comprising means for passing molten glass gobs to said machine, means connected to said machine for intitially forming from said gobs finish portions for said containers, means adjacent to said initial forming means for immediately and fully forming from said gobs the remaining portions of said containers, means for transferring the fully formed containers in spaced relationship from each other, said transferring means provided with gripping means for holding only the initially formed portions of the containers, means proximate to said gripping means for receiving said containers, said receiving means including cradle means for engaging only the finish of said containers, means for annealing said containers while engaged in said cradle means whereby said containers are subjected to a controlled rate of cooling, and means associated with said annealing means for rapidly cooling the containers.

* * * * *